(12) United States Patent
Fujimoto et al.

(10) Patent No.: US 9,126,467 B2
(45) Date of Patent: Sep. 8, 2015

(54) DAMPER WITH VARIABLE DAMPING FORCE

(75) Inventors: Gakuyo Fujimoto, Wako (JP); Shinji Mikami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 14/127,010

(22) PCT Filed: Jun. 27, 2012

(86) PCT No.: PCT/JP2012/066359
§ 371 (c)(1),
(2), (4) Date: Dec. 17, 2013

(87) PCT Pub. No.: WO2013/011812
PCT Pub. Date: Jan. 24, 2013

(65) Prior Publication Data
US 2014/0138197 A1    May 22, 2014

(30) Foreign Application Priority Data

Jul. 17, 2011 (JP) ................................. 2011-157297
Jul. 17, 2011 (JP) ................................. 2011-157299
Jul. 17, 2011 (JP) ................................. 2011-157306

(51) Int. Cl.
*F16F 9/34*   (2006.01)
*B60G 17/08*  (2006.01)
*F16F 9/46*   (2006.01)

(52) U.S. Cl.
CPC . *B60G 17/08* (2013.01); *F16F 9/34* (2013.01); *F16F 9/461* (2013.01); *F16F 9/464* (2013.01); *F16F 2224/0283* (2013.01)

(58) Field of Classification Search
CPC ......... F16F 9/3488; F16F 9/461; F16F 9/464; F16F 2224/0258; F16F 2224/0283
USPC ........................................................ 188/266.7
See application file for complete search history.

(56) References Cited

U.S. PATENT DOCUMENTS 4,729,459 A * 3/1988 Inagaki et al. ............. 188/266.7
4,948,163 A * 8/1990 Kikushima et al. ........ 188/266.5
4,949,989 A * 8/1990 Kakizaki et al. ........... 188/266.7

(Continued)

FOREIGN PATENT DOCUMENTS

EP         0623764 A1    11/1994
EP         1245854 A2 * 10/2002

(Continued)

*Primary Examiner* — Thomas J Williams
(74) *Attorney, Agent, or Firm* — Carrier Blackman & Associates, P.C.; Joseph P. Carrier; Jeffrey T. Gedeon

(57) ABSTRACT

A variable damping force member is used in a vehicle suspension device and the damping force of which can be changed. The variable damping force member is equipped with a piston which is slidably housed in a cylinder filled with a fluid and which divides the cylinder into a first fluid chamber and a second fluid chamber, and has fluid passages connecting the first and second fluid passages. A valve member is provided in the piston for blocking the fluid passages, and for opening the fluid passages when the piston slides. A piezoelectric body is connected to the valve member, and pushes the valve member towards the fluid passages when voltage is applied. A bellows is arranged on the valve member so as to seal the piezoelectric body from the fluid, and the bellows biases the piston in the direction in which the piezoelectric body is constricted.

7 Claims, 10 Drawing Sheets

(56) References Cited

U.S. PATENT DOCUMENTS

| | | | |
|---|---|---|---|
| 4,961,483 A * | 10/1990 | Yamaoka et al. | 188/266.7 |
| 5,054,809 A * | 10/1991 | Yamaoka et al. | 188/266.7 |
| 5,129,489 A * | 7/1992 | Majima et al. | 188/266.7 |
| 5,133,574 A * | 7/1992 | Yamaoka et al. | 280/5.519 |
| 5,233,834 A | 8/1993 | Tsukamoto | |
| 6,298,958 B1 * | 10/2001 | Hwang | 188/266.7 |
| 7,429,815 B2 * | 9/2008 | Gibson et al. | 310/344 |

FOREIGN PATENT DOCUMENTS

| | | | |
|---|---|---|---|
| JP | H02-203577 A | | 8/1990 |
| JP | 02221724 A | * | 9/1990 |
| JP | H04-175533 A | | 6/1992 |
| JP | H06-081879 A | | 3/1994 |
| JP | H06-241263 A | | 8/1994 |
| JP | 2008-223911 A | | 9/2008 |

* cited by examiner (a)

(b)

(a)

(b)

(a)

(b)

DAMPER WITH VARIABLE DAMPING FORCE

TECHNICAL FIELD

The present invention relates to a damping force variable damper for use in a vehicular suspension system, the damper including a cylinder and a piston slidable within the cylinder to vary a damping force.

BACKGROUND ART

A damping force variable damper of the above type includes a cylinder having first and second fluid chambers, a piston separating the first fluid chamber and the second fluid chamber from each other, and a piezoelectric body operable to vary a damping force by controlling a fluid passage through which the first and second chambers communicate with each other, as is known in patent literature 1 below.

As for a damping force variable damper disclosed in patent literature 1, a piston defines a sealed chamber for increasing an amount of deformation of a piezoelectric body. The sealed chamber includes an enlarged-diameter passage in which a first piston member is slidably disposed and a reduced-diameter passage in which a second piston member is slidably disposed.

The piezoelectric body presses the first piston member to cause a viscous fluid (hereinafter referred to as "hydraulic oil") in the sealed chamber to press the second piston. In so doing, an amount of displacement of the first piston member (i.e., the amount of deformation of the piezoelectric body) is increased in the sealed chamber for moving the second piston by the increased amount of displacement of the first piston member. When the second piston member moves, a valve member moves to control a fluid passage so as to vary a damping force.

The damping force variable damper of patent literature 1 includes an O-ring disposed on the first piston member for sealing the chamber. The O-ring disposed on the first piston member prevents the hydraulic oil in the sealed chamber from leaking toward the piezoelectric body. The damper further includes a return spring for returning the first piston (i.e., the piezoelectric body) to an original, non-displaced position when application of a voltage to the piezoelectric body is cut off.

PRIOR ART LITERATURE

Patent Literature

Patent Literature 1: JP-A-4-175533

SUMMARY OF INVENTION

Technical Problem

As for the damping force variable damper in patent literature 1 above, the O-ring is provided for preventing the leakage of the hydraulic oil toward the piezoelectric body, and the return spring is provided for returning the piezoelectric body to the original position prior to deforming. Due to the O-ring and the return spring, the number of parts of the damper undesirably increases.

It is an object of the present invention is to provide a damping force variable damper formed from the reduced number of parts and configured to prevent leakage of hydraulic oil toward a piezoelectric body and return the piezoelectric body to an original position prior to deforming.

Solution to Problem

According to one aspect of the present invention, there is provided a damping force variable damper for use in a suspension system of a vehicle, the damper providing a variable damping force and comprising: a cylinder filled with a fluid and having a first fluid chamber and a second fluid chamber; a piston slidably disposed within the cylinder, the piston separating the first fluid chamber and the second fluid chamber from each other and having a fluid passage through which the first fluid chamber communicates with the second fluid chamber; valve means disposed in the piston for closing the fluid passage, the valve means opening the fluid passage when the piston slides; a piezoelectric body connected to the valve means for pressing the valve means toward the fluid passage when a voltage is applied to the piezoelectric body; and a bellows disposed at the valve means for sealingly separating the piezoelectric body from the fluid, the bellows urging a piston in a direction to contract the piezoelectric body.

Preferably, the fluid passage is an elongated hole and has a cross-section taken perpendicular to an axial direction of the cylinder, the cross-section having an elongated curved shape along an outer circumference of the piston, and change in the voltage applied to the piezoelectric body changes a force pressing the valve means, and the change in the force changes the damping force.

Preferably, the piston is tubular, and the bellows is spaced radially inwardly from the piston, the bellows having an end portion disposed radially inwardly of the piston.

Preferably, the fluid passage includes an upper fluid passage portion to be pressed by the valve means, and a lower fluid passage portion different from the upper fluid passage portion and larger in cross-sectional area than the upper fluid passage portion.

Preferably, the valve means includes a hollow skirt portion of a generally truncated cone shape, the skirt portion having a closing end for closing the fluid passage when the fluid passage is pressed, the skirt portion having valve openings formed through a circumferential wall thereof for directing out of the skirt portion the fluid introduced through fluid passage into the skirt portion.

Preferably, the piston includes a cylindrical lower wall portion disposed outside the skirt portion, the lower wall portion including a circumferential wall having piston openings formed therethrough such that an inside of the lower wall portion communicates with an outside of the lower wall portion through the piston openings, the piston openings circumferentially overlapping the valve openings.

Preferably, the skirt portion is spaced from the lower wall portion.

Preferably, the skirt portion is partially in slidable contact with the lower wall portion.

Advantageous Effects of Invention

The bellows is attached to a piston cylinder to seal the piezoelectric body off for presenting the fluid from being directed to the piezoelectric body so as to protect the piezoelectric body from the fluid.

In the prior art, a hydraulic fluid remained between a piezoelectric body and a valve or moved (leaked) from therebetween, making the valve inoperable. In the present invention, the bellows disposed on the piston urges the piston in a direction to contract the piezoelectric body, thereby urging the valve means in a direction to open the fluid passages against the piezoelectric body. It is thus ensured that the valve means is opened. Since the piezoelectric body can produce a force sufficiently larger than the urging force of the bellows, the urging force gives the least influence on control over the piezoelectric body. Additionally, the piston (i.e., the piezoelectric body) can return to an original, non-deformed position under the urging force of the bellows when application of a voltage to the piezoelectric body is cut off. Therefore, functions of two members, i.e., an O-ring and a return spring both necessary in the prior art can be provided by a single member, i.e., the bellows. This makes it becomes possible to reduce the number of parts of the damper.

The fluid passage is the elongated hole and has the cross-section taken perpendicular to the axial direction of the cylinder, the cross-section having the elongated curved shape along the outer circumference of the piston. By changing the voltage applied to the piezoelectric body to change the force pressing the valve means, the damping force can be changed easily.

It is possible to prevent the bellows from contacting the cylinder bore during sliding of the piston in the cylinder bore. Thus, the piston can smoothly slide without impairing a leakage preventing function and a returning function of the bellows, thereby successfully maintaining quality of the damping force variable damper.

The fluid passage has the portion to be pressed by the valve means and the other portion having the larger cross-sectional area than the portion to be pressed by the valve means. In order to make a resistance of the fluid passage low, the fluid passage may be configured to have a large opening area (cross-sectional area) of the fluid passage along the entire length thereof. However, if the cross-sectional area of the fluid passage is large along the entire length thereof, the valve means for closing the fluid passage is required to have a large size. In addition, the size of the piezoelectric body is large. In the present invention, the fluid passage has the large cross-sectional area only at other than the portion to be pressed by the valve means. The resistance of the fluid passage having the large cross-sectional area except for the portion to be pressed by the valve means is not so large. Thus, it is possible to allow the fluid to smoothly flow through the fluid passages, thereby providing an appropriate damping force of the damping force variable damper.

Since the portion to be pressed by the valve means has the small cross-sectional area, a space for accommodating the valve means and the piezoelectric body can be small. Thus, the damping force variable damper can be small in size, thereby enhancing the freedom to determine arrangement (layout) of the damping force variable damper.

The fluid passage has a large overall perimeter length such that a "flow passage cross-sectional area" of the fluid passage is variable over a wide range.

The skirt portion of the valve means moves away from the fluid passages to open the fluid passages during sliding of the piston, such that the fluid in the fluid passages can be directed to the inside and outside of the skirt portion.

The valve openings are formed through the circumferential wall of the skirt portion such that the fluid directed into the inside of the skirt portion can be directed out of the skirt portion through the valve openings. When the fluid passages are opened during sliding of the piston, the fluid can be smoothly directed through the open fluid passages toward the skirt portion.

The fluid passage is formed along an outer circumference of the piston so as to provide a wide range over which the flow passage cross-sectional area can vary, and the plurality of the valve openings are formed through the circumferential wall of the skirt portion so as to allow for the smooth flow of the fluid through the fluid passages. Thus, the fluid can flow smoothly in correspondence to the range of the variable flow passage cross-sectional area. The damping force variable damper can thus vary a damping force over the wide range. In addition, the damping force can be changed with easy control. That is, the wide range over which the damping force of the damping force variable damper is variable can be established with easy control.

The cylindrical lower wall portion of the piston has the piston openings formed therethrough such that the inside of the lower wall portion communicates with the outside of the lower wall portion through the piston openings. The piston openings circumferentially overlap the valve openings of the skirt portion. Thus, the fluid directed into the skirt portion can be directed through the valve openings and the piston openings to outside of the lower wall portion. When the fluid passages are opened during sliding of the piston, the fluid can be smoothly directed through the open fluid passages toward the skirt portion. The fluid can thus flow smoothly in correspondence to the range of the variable flow passage cross-sectional area. The damping force variable damper can thus vary a damping force over the wide range.

The skirt portion is spaced from the lower wall portion. This allows for effective use of a flow path formed in a lower area of the outside of the skirt portion when the valve means is opened.

The skirt portion is partially in slidable contact with the lower wall portion. The valve means is thus unlikely to deform falling over. As a result, it becomes possible to prevent the valve means from partially wearing away.

DESCRIPTION OF EMBODIMENT

A certain preferred embodiment of the present invention is described below with reference to the accompanying drawings.

Embodiment

Figure 1:
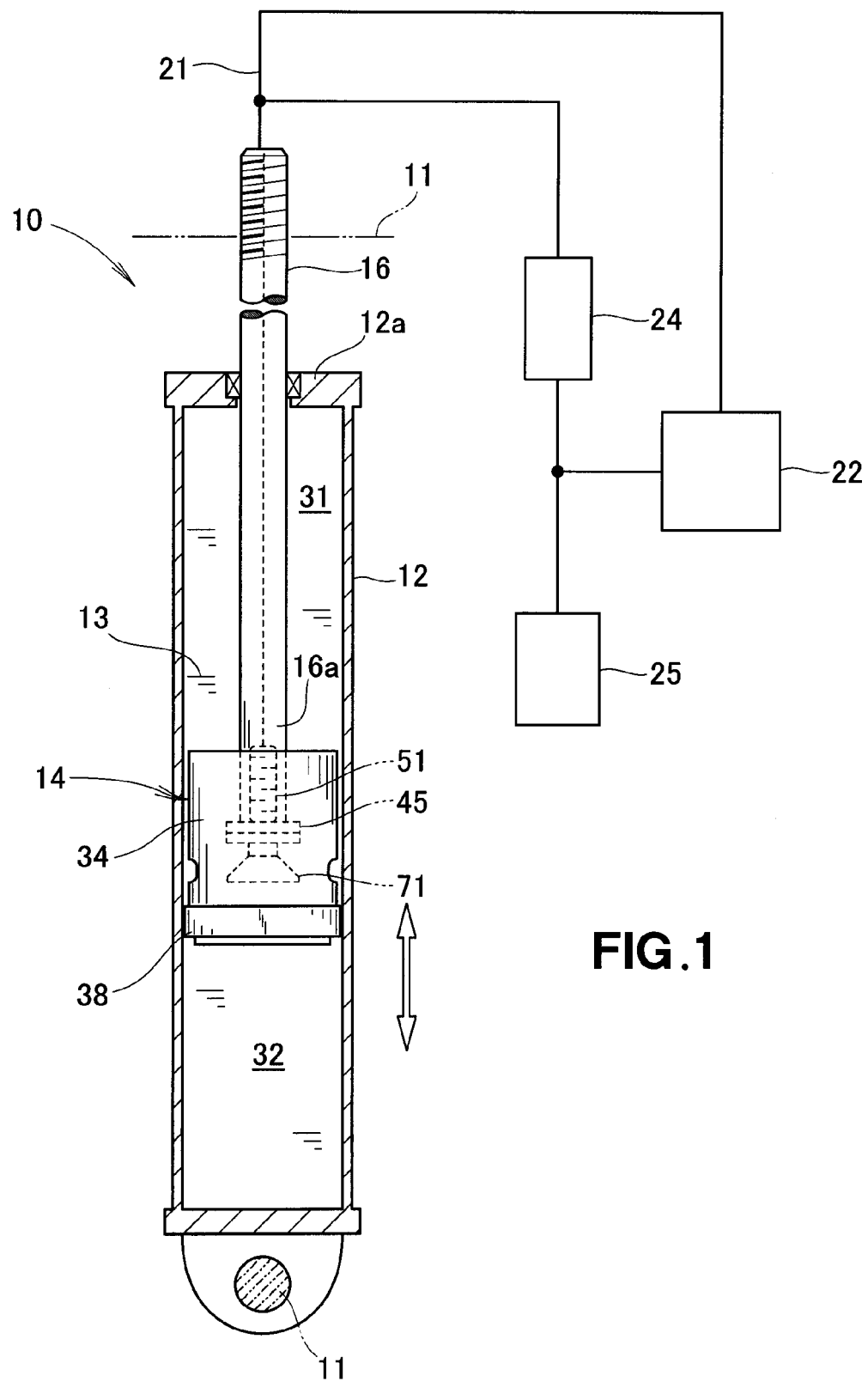
FIG. 1 is a cross-sectional view of a damping force variable damper in an embodiment of the present invention.

As shown in FIG. 1, a damping force variable damper 10 is use in a suspension system of a vehicle 11 and provides a variable damping force. The damping force variable damper 10 includes a cylinder (a cylinder tube) 12, a piston assembly 14 slidably accommodated in the cylinder 12, and a piston rod 16 connected to the piston assembly 14 and protruding out of an upper end portion 12a of the cylinder 12.

The piston assembly 14 of the damper 10 includes a piezoelectric body 51 connected through a wire harness 21 to a control section 22 and a power source (a battery) 24 connected to an electrical component 25.

The cylinder 12 is filled with a hydraulic oil (a fluid) 13. The piston assembly 14 is accommodated in the cylinder 12 in such a manner as to slide longitudinally of the cylinder 12, as indicated by an arrow. The cylinder 12 has upper and lower fluid chambers (first and second fluid chambers) 31, 32 separated from each other by the piston assembly 14 accommodated in the cylinder 12.

When the damping force variable damper 10 is subjected to a pressure, the piston assembly 14 slides within the piston 12 in the directions of the arrow to thereby move the hydraulic oil 13 between the upper fluid chamber 31 and the lower fluid chamber 32. The movement of the hydraulic oil 13 between the upper fluid chamber 31 and the lower fluid chamber 32 produces a damping force of the damper 10.

Figure 2:
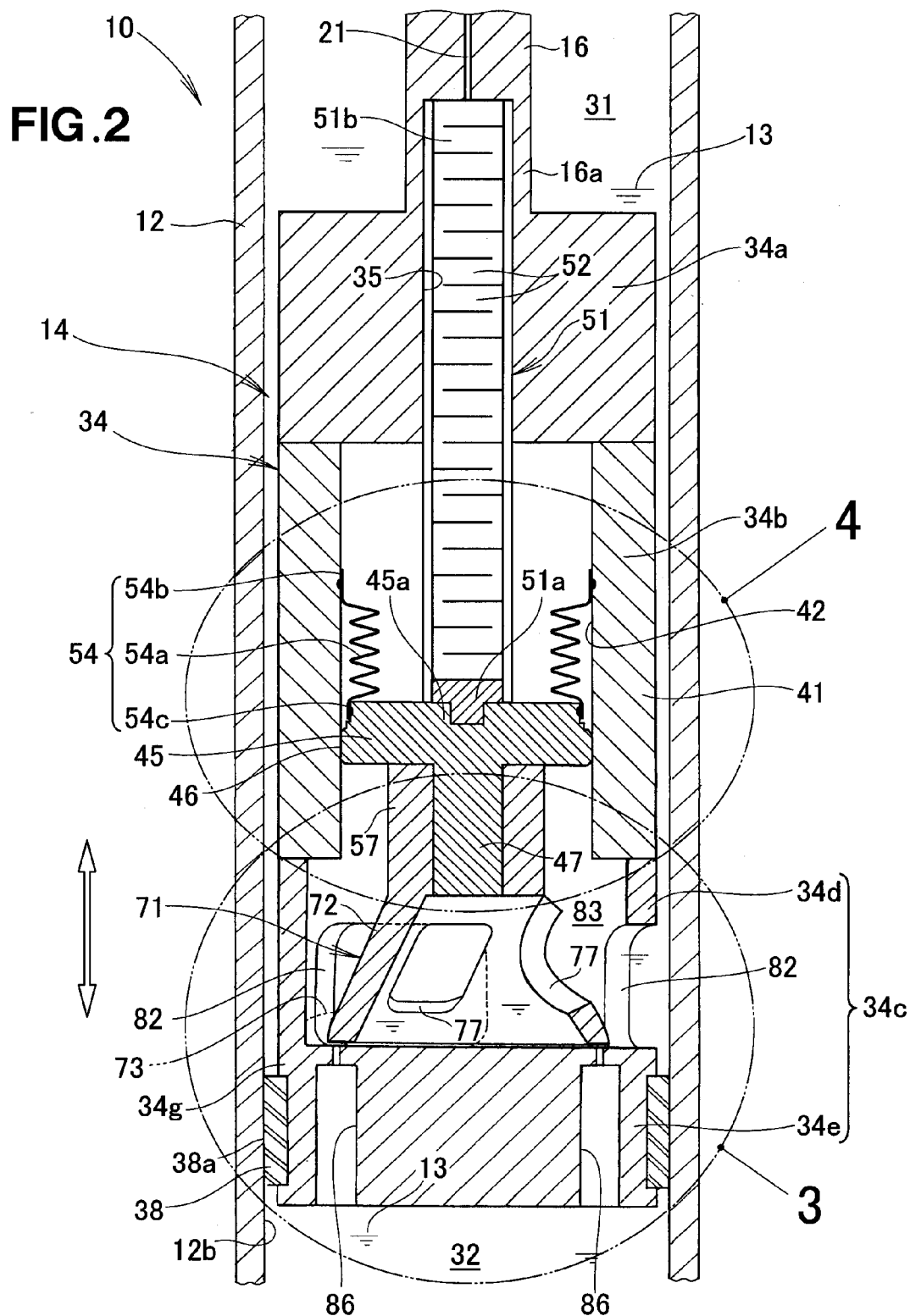
FIG. 2 is a cross-sectional view of a piston assembly of the damping force variable damper shown in FIG. 1.
Figure 3:
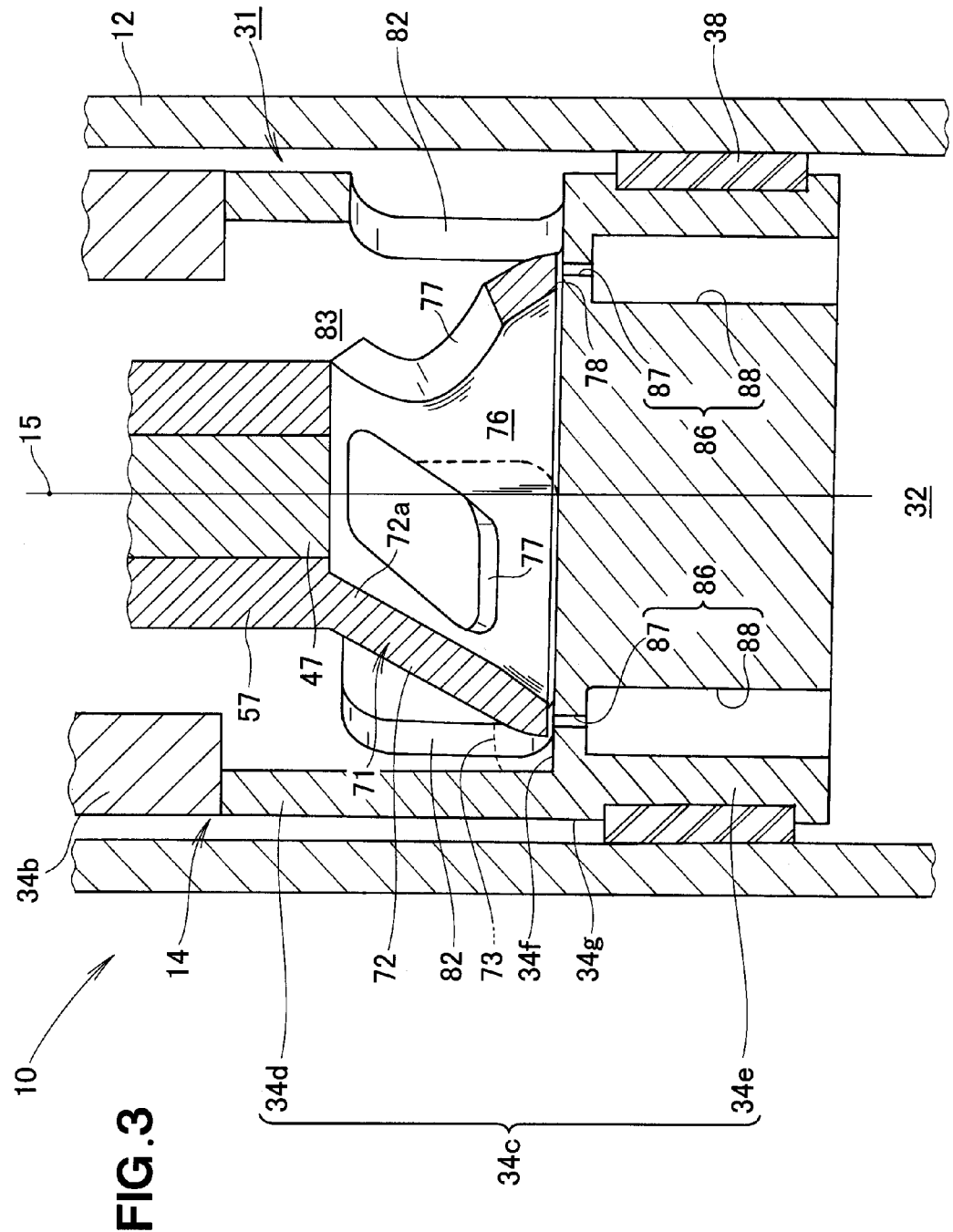
FIG. 3 is an enlarged cross-sectional view of a region 3 of FIG. 2.

As shown in FIG. 2 and FIG. 3, the piston assembly 14 includes a piston case (a piston) 34 slidably accommodated in the cylinder 12, a piston cylinder 41 incorporated in the piston case 34, a piston 45 disposed in the piston cylinder 41, the piezoelectric body 51 connected to the piston 45, and a tubular bellows 54 sealing the piezoelectric body 51 off.

The piston assembly 14 further includes a valve member 71 (also referred to as valve means 71) disposed on a lower portion of the piston 45. The valve means 71 includes a cylindrical portion 57 mounted on a downward protruding portion 47 formed on the piston 45.

The piston case 34 is a cylindrical case accommodated in the cylinder 12 in such a manner as to slide in an axial (up-and-down) direction of the cylinder 12. The piston case 34 includes an upper section 34a, a wall section 34b and a lower section 34c. A piston ring 38 is disposed on the lower section 34c. The piston case 34 is connected to the piston rod 16 through connection of the upper section 34a to a lower portion 16a of the piston rod 16.

The upper section 34a of the piston case 34 has a locking hole 35 formed centrally thereof, and the piezoelectric body 51 is locked in the locking hole 35. The wall section 34b of the piston case 34 has a hollow inside defining the piston cylinder 41. The piston cylinder 41 will be set forth hereinafter in detail.

The lower section 34c of the piston case 34 includes a lower wall portion 34d disposed on the wall section 34b, and a bottom portion 34e contiguous with the lower wall portion 34d. The lower wall portion 34d is located outside the valve means 71. The lower wall portion 34d is cylindrical and includes a circumferential wall having a plurality of piston openings 82 formed therethrough. Via the piston openings 82 of the lower wall portion 34d, a valve accommodating space 83 formed within the lower wall portion 34d communicates with the upper fluid chamber 31.

The bottom portion 34e separates an inside of the piston case 34 (the valve accommodating space 83) and an outside of the piston case 34 (the lower fluid chamber 32) from each other. The bottom portion 34e has a plurality of fluid passages 86 located below the piston openings 82. The fluid passages 86 are formed along an outer circumference 34g of the bottom portion 34e. Via the fluid passages 86 of the bottom portion 34e, the valve accommodating space 83 within the piston case 34 communicates with the lower fluid chamber 32. The piston openings 82 and the fluid passages 86 will be set forth hereinafter in detail.

The piston ring 38 is disposed on the outer circumference 34g of the bottom portion 34e. The piston ring 38 is annular and has an outer circumferential surface 38a slidably contacting an inner circumferential surface 12b of the cylinder 12. Thus, the piston assembly 14 is supported by the piston ring 38 in such a manner as to stably slide in the axial direction of the cylinder 12 as shown by the arrow.

By slidably contacting the inner circumferential surface 12b of the cylinder 12, the outer circumferential surface 38a of the piston ring 38 and the inner circumferential surface 12b form a seal therebetween such that the piston ring 38 separates the upper fluid chamber 31 and the lower fluid chamber 32 from each other.

The hollow piston cylinder 41 has a cylindrical bore 42 of an enlarged diameter. The enlarged diameter cylindrical bore 42 has a large inner diameter providing a large cross-sectional area.

The piston 45 is axially slidably disposed within the cylinder bore 42. The piston 45 has an upper portion 45a connected to a lower end portion 51a of the piezoelectric body 51. The piston 45 is slidable within the cylinder bore 42, and the bellows 54 has a lower end portion 54c disposed on an outer circumference of the upper portion 45a of the piston 45.

The piezoelectric body 51 is formed by a plurality of single-piece piezoelectric elements 52 vertically laminated together. The piezoelectric body 51 has an upper portion 51b received in the lower portion 16a of the piston rod in coaxial relationship therewith and located opposite the valve accommodating space 83. The lower end portion 51a of the piezoelectric body 51 is connected to the upper portion 45a of the piston 45 in contact therewith.

The piezoelectric body 51 is connected via the wire harness 21 to the control section 22 and the power source 24 (FIG. 1). The control section 22 shown in FIG. 1 has a function of switching a state in which a voltage of the power source 24 is applied to the piezoelectric body 51 to a state in which the voltage of the power source 24 is not applied to the piezoelectric body 51, or vice versa. In addition, the control section 22 has a function of adjusting (changing) the voltage of the power source 24 applied to the piezoelectric body 51.

The piezoelectric body 51 shown in FIG. 2 has a function of extending or stretching when the voltage of the power source 24 (FIG. 1) is applied to the piezoelectric body 51. By stretching, the piezoelectric body 51 presses the piston 45 downwardly.

Figure 4:
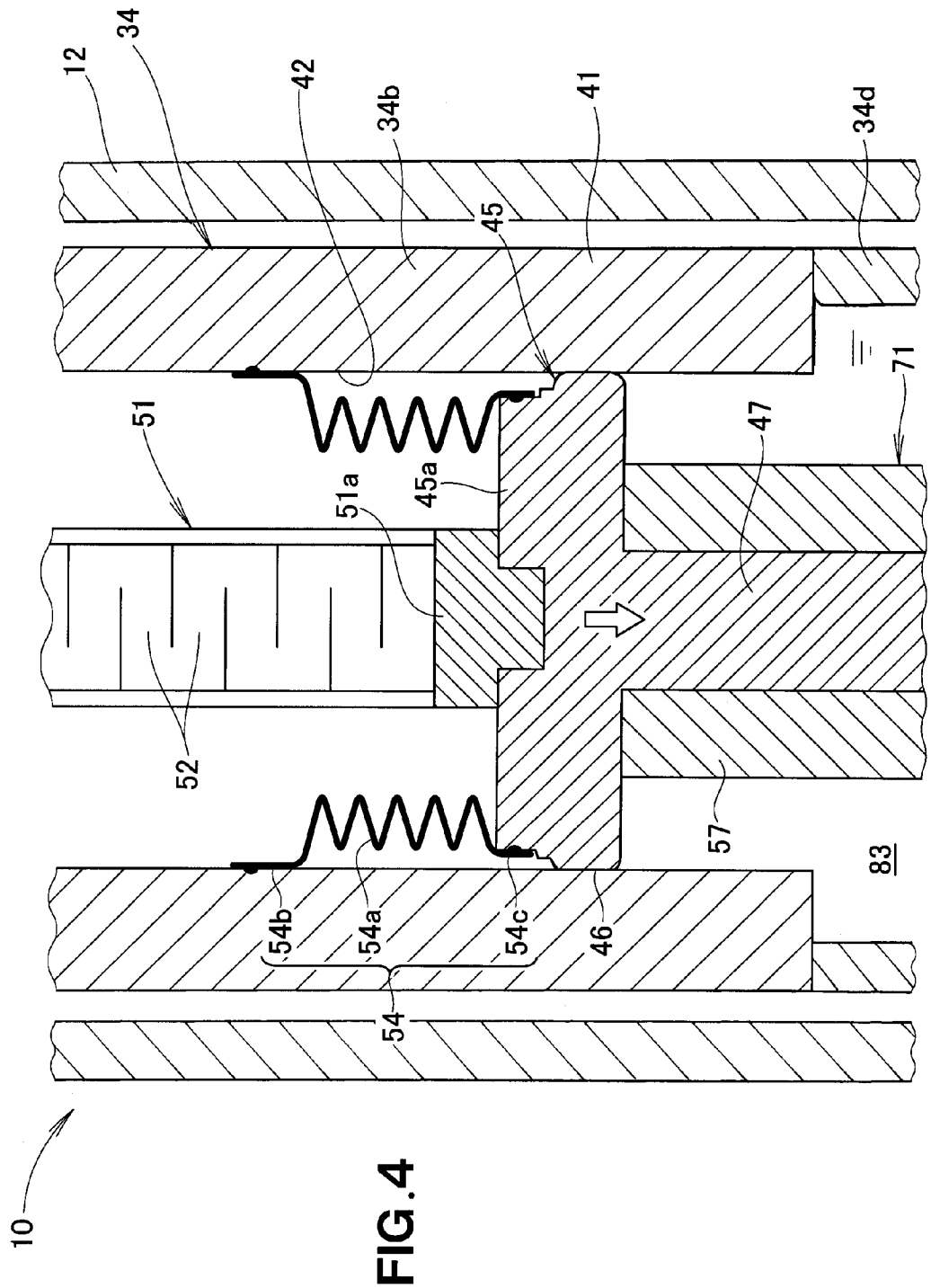
FIG. 4 is an enlarged cross-sectional view of a region 4 of FIG. 2.
Figure 5:
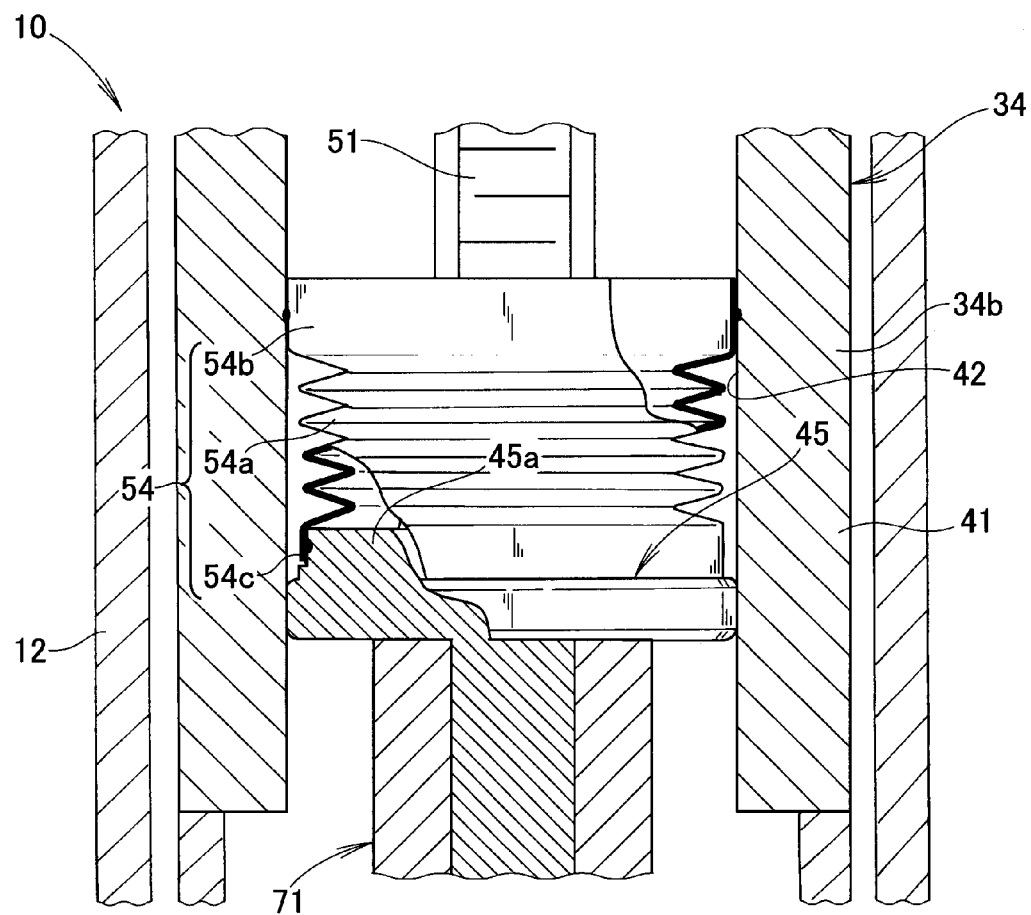
FIG. 5 is a cross-sectional view showing relationships among a cylinder bore, a piston and a bellows shown in FIG. 2.

As shown in FIG. 4 and FIG. 5, the lower end portion 51a of the piezoelectric body 51 is covered with the bellows (tubular urging means) 54. The bellows 54 is made of metal such as steel material. The bellows 54 is of a cylindrical shape including an urging portion 54a having a bellows-shaped circumferential wall, an annular, upper attachment portion 54b provided by an upper end of the urging portion 54a, and an annular, lower attachment portion 54c provided by the lower end portion of the bellows 54. The upper attachment portion 54b is joined to the cylindrical bore 42, and the lower attachment portion 54c is joined to the outer circumference of the piston 45 (the upper portion 45a). The bellows 54 acts as a spring member due to the bellows-shaped urging portion 54a.

By the upper attachment portion 54b of the bellows 54 being joined to the cylindrical bore 42 and the lower attachment portion 54c being joined to the outer circumference of the upper portion 45a, a seal is formed between the piston 45 and the cylinder bore 42. That is, an inside space of the bellows 54 is separated from an outside space of the bellows 54. Thus, the lower end portion 51a of the piezoelectric body 51 accommodated in the inside space of the bellows 54 is separated from the outside space of the bellows 54.

The upper portion 45a of the piston 45 has an outer diameter smaller than an outer diameter of a lower half of the piston 45, i.e., a sliding portion 45c of the piston 45. The piston 45 is slidably disposed in the cylinder bore 42 of the piston cylinder 41. More specifically, between the piston 45 and the cylinder bore 42, a gap 46 is formed to allow the piston 45 to slide in the cylinder bore 42. Via the gap 46, the cylinder bore 42 communicates with the valve accommodating space 83. The hydraulic oil 13 would leak from the valve accommodating space 83 through the gap 46 in a direction toward the piezoelectric body 51, but is prevented by the bellows 54 from flowing onto the piezoelectric body 51.

By preventing the flow of the hydraulic oil 13 onto the piezoelectric body 51, the bellows 54 protects the piezoelectric body 51 from the hydraulic oil 13. That is, the bellows 54 functions as a seal member such an O-ring.

The urging portion 54a of the bellows 54 is held in a stretching position with the upper attachment portion 54b joined to the cylinder bore 42 and the lower attachment portion 54c joined to the outer circumference of the upper portion 45a of the piston 45. The urging portion 54a of the bellows 54 provides a function of a spring member due to the bellows-shape.

The piston 45 is slidably disposed in the cylinder bore 42 of the piston cylinder 41, such that the piston 45 can be pulled up by an urging force of the urging portion 54a of the bellows 54.

The lower end portion 51a of the piezoelectric body 51 is connected to the upper portion 45a of the piston 45. The urging portion 54a of the bellows 54 urges the piston 45 to pull the piston 45 up, thereby urging the piezoelectric body 51 in a direction to contract (compress) the piezoelectric body 51. This allows the urging force of the bellows 54 to return the piezoelectric body 51 back to an original, non-deformed (or non-stretched) position when the application of the voltage to the piezoelectric body 51 is cut off. That is, the bellows 54 has a (returning) function of a spring member having an urging force.

By having both the function of preventing the hydraulic oil from leaking onto the piezoelectric body and the function of returning the piezoelectric body to the original position, the bellows 54 serves as both a seal member and a spring member. That is, functions of two members, i.e., an O-ring and a return spring both necessary in the prior art can be provided by a single member, i.e., the bellows 54. This makes it possible to reduce the number of parts of the damper.

The tubular urging means is a simple member because the metal bellows 54 is used as the tubular urging means. That is, the leakage preventing function and the returning function can be provided by the simple structure.

The outer circumference of the upper portion 45a is spaced radially inwardly from the cylinder bore 42 and the lower attachment portion 54c of the bellows 54 fits around and is welded to the outer circumference of the upper portion 45a. Thus, the lower attachment portion 54c of the bellows 54 is spaced radially inwardly from the cylinder bore 42.

The urging portion 54a has an outer diameter set such that the urging portion 54a is spaced radially inwardly from the cylinder bore 42. More specifically, the urging portion 54a remains spaced radially inwardly from the cylinder 42 during stretching or contraction (compression) of the urging portion 54a.

Since the lower attachment portion 54c and the urging portion 54a are spaced radially inwardly from the cylinder bore 42, the bellows 54 is spaced radially inwardly from the cylinder bore 42, so as to prevent the bellows 45 from contacting the cylinder bore 42, i.e., the piston case 34 during sliding of the piston 45 in the cylinder bore 42. It is thus unlikely that the leakage preventing function and the returning function of the bellows 54 are impaired. Since the piston 45 can smoothly slide without impairing the leakage preventing function and the returning function of the bellows 54, quality of the damping force variable damper 10 can be successfully maintained.

The piston 45 is slidably disposed in the cylinder bore 42 of the piston cylinder 41. More specifically, the gap 46 is formed between the piston 45 and the cylinder bore 42 to allow the piston 45 to slide in the cylinder bore 42. The valve accommodating space 83 communicates with the cylinder bore 42 via the gap 46. By covering the lower end portion 51a of the piezoelectric body 51, the bellows 53 separates the piezoelectric body 51 from the valve accommodating space 83.

The piston 45 is connected to the lower end portion 51a of the piezoelectric body 51. On the lower portion of the piston 45, the valve means 45 is disposed. Thus, when the piezoelectric body 51 stretches, the valve means 71 is pressed downwardly.

Namely, the piezoelectric body 51 is connected via the piston 45 and the valve accommodating space 83 to the valve means 71. By providing the piston 45 and the valve accommodating space 83 between the piezoelectric body 51 and the valve means 71, the valve means 71 can move a sufficient amount.

Next, the valve means 71 is discussed with reference to FIG. 2 and FIG. 3. The valve means 71 includes a cylindrical portion 57 and a skirt portion 72 flaring downwardly from a lower end of the cylindrical portion 57. The lower wall portion 34d has the plurality of the piston openings 82 formed therethrough. More specifically, the piston openings 82 are located along the bottom portion 34e (a surface 34f of the bottom portion 34e) and spaced circumferentially of the lower wall portion 34d at predetermined intervals (e.g., 120 degrees (FIG. 7)) from one another.

The piston openings 82 are of generally rectangular shapes. Via the plurality of the piston openings 82 formed through the lower wall portion 34d, an inside of the lower wall portion 34d communicates an outside of the lower wall portion 34d. More specifically, via the piston openings 82, the valve accommodating space 83 inside the lower wall portion 34d communicates with the upper fluid chamber 31 (FIG. 2) outside the lower wall portion 34d.

Figure 7:
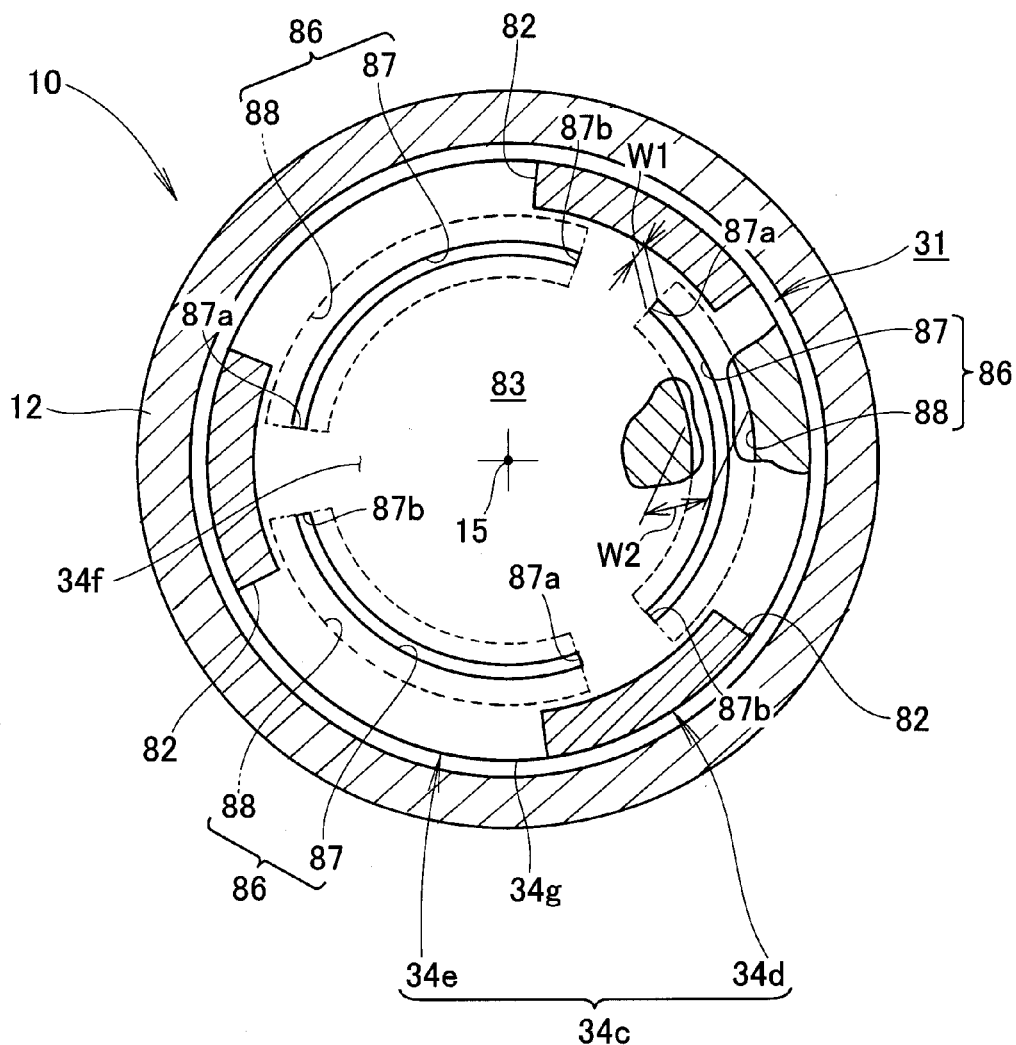
FIG. 7 is a cross-sectional view taken along line 7-7 of FIG. 6.

As shown in FIG. 3 and FIG. 7, the bottom portion 34e defines a lower end portion of the lower wall portion 34d, and the plurality of fluid passages 86 are formed along the outer circumference 34g of the bottom portion 34e at predetermined intervals. For example, the plurality of fluid passages 86 may be spaced at 120 degrees from one another. The fluid passage 86 includes an upper fluid passage portion 87 (to be pressed by the valve means 71), and a lower fluid passage portion 88 (different from the upper fluid passage portion 87). The upper fluid passage portion 87 is located on a side of the valve accommodating space 83. The lower fluid passage portion 88 communicates with a lower end of the upper fluid passage portion 87.

The upper fluid passage portion 87 located on the side of the valve accommodating space 83 inside the lower wall portion 34d extends in the form of a curve clockwise from one end 87a to an opposite end 87b along the outer circumference 34g of the bottom portion 34e. In other words, by extending along the outer circumference 34g of the bottom portion 34e, the upper fluid passage portion 87 takes an elongated (slit)

shape having a curved cross-section taken in a direction perpendicular to an axis 15 of the cylinder 12.

That is, the upper fluid passage portion 87 is a passageway in the form of a curved elongated hole (a slit-shaped opening). Via the fluid passages 86 formed through the bottom portion 34e, the valve accommodating space 83 within the lower wall portion 34d communicates with the lower fluid chamber 32 outside the lower wall portion 34d.

The lower fluid passage portion 88 extends along the axis 15 (downwardly) from a lower end of the upper fluid passage portion 87. The lower fluid passage portion 88 has a width W2 larger than a width W1 of the upper fluid passage portion 87 such that the lower fluid passage portion 88 has a cross-sectional area (the opening area) larger than a cross-sectional area (the opening area) of the upper fluid passage portion 87. As a result, it is possible to prevent the fluid passage 86 from providing excessively high resistance when the hydraulic oil 13 flows through the fluid passage 86, and hence the hydraulic oil 13 can be smoothly delivered through the fluid passage 86.

Additionally, by the lower fluid passage portion 88 having the large cross-sectional area to establish the appropriate resistance of the fluid passage 86, the cross-sectional area of the upper fluid passage portion 87 can be so small that the valve means 71 for opening and closing the upper fluid passage portion 87 is compact. A reason why the cross-sectional area of the upper fluid passage portion 87 is small is described hereinafter in detail.

Figure 6:
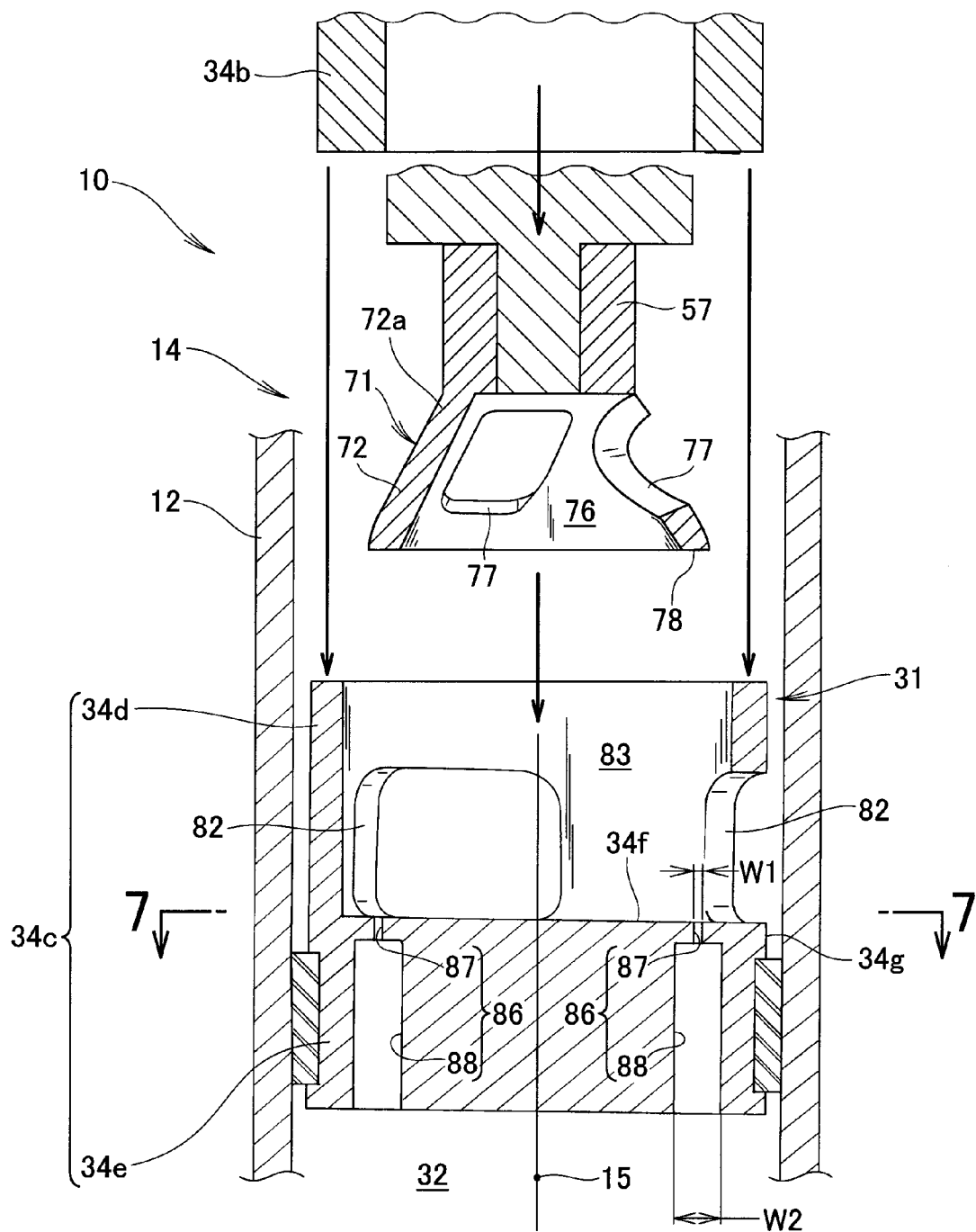
FIG. 6 is a cross-sectional view of the piston assembly shown in FIG. 3 as the piston assembly is disassembled.

As shown in FIG. 3, FIG. 6 and FIG. 7, via the piston openings 82 formed through the lower wall portion 34d, the valve accommodating space 83 within the lower wall portion 34d communicates with the upper fluid chamber 31. Via the fluid passages 86 formed through the bottom portion 34e, the valve accommodating space 83 within the lower wall portion 34d communicates with the lower fluid chamber 32.

That is to say, the upper fluid chamber 31 communicates with the lower fluid chamber 32 via the piston openings 82, the valve accommodating space 83, and the fluid passages 86. In other words, the fluid passages 86 cooperates with the valve accommodating space 83 and the piston openings 82 to establish communication of the upper fluid chamber 31 with the lower fluid chamber 32.

As shown in FIG. 2 and FIG. 3, the valve means 71 is disposed above the fluid passages 86. The skirt portion 72 is formed integrally with the cylindrical portion 57. The skirt portion 72 takes the shape of a generally truncated cone and has a valve inner space 76 formed therewithin. The skirt portion 72 is disposed inside the lower wall portion 34d in spaced relationship therewith except that the skirt portion 72 has one part defining a slidable contact portion 73 which is in slidable contact with the lower wall portion 34d. The valve means 71 (the skirt portion 72) is thus unlikely to deform falling over. As a result, it becomes possible to prevent the valve means 71 from partially wearing away. The skirt portion 72 of the generally truncated cone shape has a plurality of valve openings 77 formed through a circumferential wall thereof. The circumferential wall of the skirt portion 72 has a lower end defining a closing lower end 78.

The hydraulic oil 13 delivered through the fluid passages 86 into the valve inner space 76 within the skirt portion 72 is directed by the valve openings 77 into the valve accommodating space 83 formed outside the skirt portion 72. The valve openings 77 are spaced circumferentially of the circumferential wall of the skirt portion 72 at predetermined intervals (e.g. 120-degree intervals), as are the piston openings 82. Thus, the plurality of valve openings 77 each circumferentially overlaps the respective piston openings 82.

The piston opening 82 is larger in size than the valve opening 77, such that the entire area of the valve opening 77 is aligned with the corresponding piston opening 82.

As a result, the hydraulic oil 13 within the valve inner space 76 can be smoothly directed through the valve openings 77, the valve accommodating space 83 and the piston openings 82 into the upper fluid chamber 31 formed outside the lower wall portion 34d. By smoothly directing the hydraulic oil 13 within the valve inner space 76 to the upper fluid chamber 31, the hydraulic oil 13 in the lower fluid chamber 32 can be smoothly directed through the fluid passages 86 toward the skirt portion 72.

The closing lower end 78 is pressed against the fluid passages 86 to thereby close the fluid passages 86. More specifically, the closing lower end 78 abuts on the fluid passages 86 (the upper fluid passage portions 87) when the piezoelectric body 51 (FIG. 2) is in the stretching position with the voltage applied to the piezoelectric body 51. The closing lower end 78 closes the upper fluid passage portion 87 as the closing lower end 78 is pressed against (abutting on) the upper fluid passage portions 87.

As discussed above, the piston ring 38 is disposed on the outer circumference 34g of the bottom portion 34e, thereby adding to a thickness of the bottom portion 34e. For this reason, the fluid passage 86 would provide a high resistance to flow of the hydraulic oil 13 through the fluid passage 86 as the case may be.

In order to make the resistance of the fluid passage 86 low, the fluid passage 86 may be configured to have a large cross-sectional area (opening area) along the entire length thereof. However, if the cross-sectional area of the fluid passage 86 is large along the entire length thereof, the closing lower end 78 (i.e., the valve means 71) to close the fluid passage 86 is required to have a large size. In addition, a load which the piezoelectric body 51 is required to apply is large, and hence the size of the piezoelectric body 51 is large. As a result, it would have been difficult to downsize the valve means 71 and the piezoelectric storage space (i.e., the locking hole 35 (FIG. 2) of the upper section 34a), that is, the damping force variable damper 10.

In view of the above, therefore, the fluid passage 86 is configured to have a large cross-sectional area (opening area) only along the length of the lower fluid passage portion 88, and the upper fluid passage portion 87 has a small cross-sectional area (opening area). In this instance, the fluid passage 86 provides a low resistance, and the closing lower end 78 to press the fluid passage 86 (i.e., the upper fluid passage portion 87) has a small size. As a result, the valve means 71 and the piezoelectric storage space (the locking hole 35 (FIG. 2)), that is, the damping force variable damper 10 is small in size, which in turn enhances the freedom to determine arrangement (layout) of the damping force variable damper 10.

As discussed above, the entire area of the valve opening 77 is aligned with the corresponding piston opening 82. When the fluid passages 86 are opened during sliding of the piston assembly 14, the hydraulic oil 13 can be smoothly directed through the open fluid passages 86 toward the skirt portion 72. This results in the damping force variable damper 10 providing an appropriate damping force.

The control section 22 shown in FIG. 1 adjusts the voltage of the power source 24 applied to the piezoelectric body 51 to change a pressure for moving the skirt portion 72 to an open position. Even when the skirt portion 72 moves a smaller distance to the open position under the changed pressure, the cross-sectional area larger than was found in the art is established to allow for smooth flow of the hydraulic oil 13. As a result, the damping force variable damper 10 can vary the damping force over a wide range.

The damping force variable damper 10 is configured such that the fluid passages 86 closed by the closing lower end 78 pressed by the piezoelectric body 51 in the stretching position can be opened against a spring component of the piezoelectric body 51 and the pressing force exerted by the piezoelectric body 51 on the valve means 71. In addition, the damping force variable damper 10 is configured to control the voltage applied to the piezoelectric body 51 to change the pressing force pressing the valve means 71.

The change in the pressing force pressing the valve means 71 changes the pressure to open the valve means 71 in correspondence to the changed pressing force during sliding of the piston assembly 14. The change in the pressure to open the valve means 71 (or change in an after-mentioned "flow passage cross-sectional area" of the fluid passage 86) during the sliding of the piston assembly 14 can change the damping force provided by the damping force variable damper 10. That is to say, the damping force can be changed by changing the pressing force exerted by the piezoelectric body 51 on the valve means 71.

A well-known damping force variable damper is configured to selectively contract and extend a piezoelectric body with a voltage applied to the piezoelectric body for adjusting an opening area of a fluid passage so as to change a damping force. As for such a damper, however, the contraction and extension of the piezoelectric body for adjusting the opening area of the fluid passage requires a complicated control of the voltage applied to the piezoelectric body.

In contrast to that well-known damper, the damping force variable damper 10 in the embodiment changes the damping force by changing the pressing force exerted by the piezoelectric body 51 on the valve means 71. Thus, unlike a prior art damper, an amount by which the piezoelectric body 51 moves the valve means 71 need not be adjusted more accurately than necessary. Since there is no need for such a high accurate adjustment of the amount of movement of the valve means 71, it is not necessary that the voltage applied to the piezoelectric body 51 in moving the valve means 71 be controlled in a complicated manner.

Thus, the voltage applied to piezoelectric body 51 is easy to control, and the damping force of the damping force variable damper 10 can be changed by the simple control. In this regard, a relationship between the voltage applied to the piezoelectric body 51 and the damping force provided in correspondence to the voltage may be mapped to make adjustment of the damping force easier.

Figure 8:
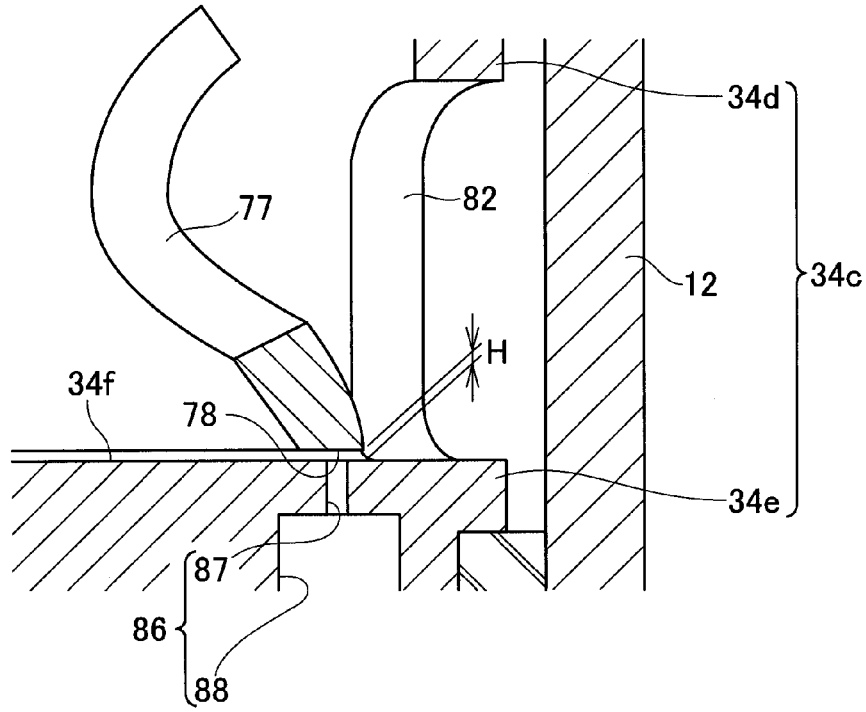
FIGS. 8(a)-(b) are cross-sectional views showing a relationship between valve means and a fluid passage.
Figure 8:
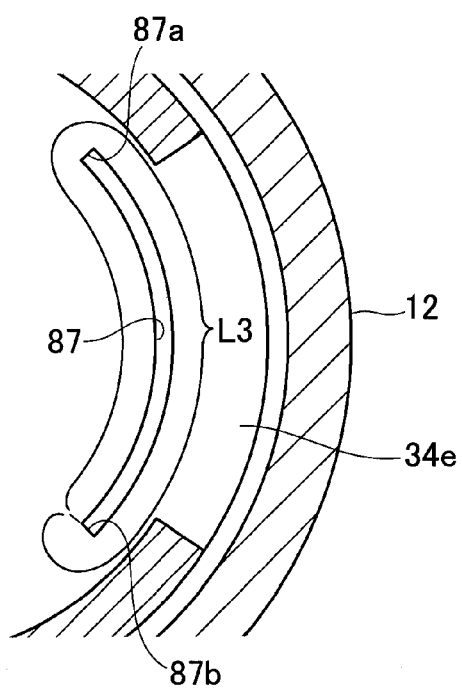

As shown in FIG. 8(a) and FIG. 8(b), when the closing lower end 78 is spaced from the fluid passage 86 (the upper fluid passage portion 87), the "flow passage cross-sectional area" S3 of the fluid passage 86 is determined by a distance H between the surface 34f of the bottom portion 34e and the closing lower end 78 and an overall length L3 of a perimeter of the upper fluid passage portion 87. More specifically, the flow passage cross-sectional area S3 is expressed by S3= H×L3.

When the flow passage cross-sectional area S3 (H×L3) exceeds a cross-sectional area S4 of the upper fluid passage portion 87, the cross-sectional area S4 of the upper fluid passage portion 87 is the flow passage cross-sectional area. That is, the flow passage cross-sectional area S3 (H×L3) can vary in a wide range of 0 to S4.

The distance H between the upper fluid passage portion 87 and the closing lower end 78 of the skirt portion 72 of the valve means 71 cannot be set so large. This is because the piezoelectric body 51 stretches (and contracts) a small amount by which the valve means 71 moves.

Taking account of the distance being not large, the fluid passage 86 (the upper fluid passage portion 87) is in the form of the elongated curved hole extending along the outer circumference 34g of the bottom portion 34e. This upper fluid passage portion 87 has the overall perimeter length L3 larger than, e.g., the sum of overall lengths of perimeters of plurality of circles. Since the overall perimeter length L3 of the upper fluid passage portion 87 is large, the range over which the flow passage cross-sectional area S3 of the fluid passage 86 can vary is wide.

As shown in FIG. 3, additionally, when the skirt portion 72 of the valve means 71 moves away from the fluid passages 86 (the upper fluid passage portions 87) to open the fluid passages 86 during sliding of the piston assembly 14, the hydraulic oil 13 which has flowed from the lower fluid chamber 32 into the fluid passages 86 is directed into both the valve accommodating space 83 outside the skirt portion 72 and the valve inner space 76 inside the skirt portion 72.

The hydraulic oil 13 directed into the valve accommodating space 83 is then directed through the piston openings 82 of the lower wall portion 34d into the upper fluid chamber 31.

Meanwhile, the hydraulic oil 13 directed into the valve inner space 76 is then directed through the valve openings 77 into the valve accommodating space 83, and subsequently through the piston openings 82 into the upper fluid chamber 31. Accordingly, it is ensured that the hydraulic oil 13 smoothly flows through the fluid passages 86 opened during the sliding of the piston assembly 14.

As discussed above, the range over which the flow passage cross-sectional area S3 can vary is wide due to the fluid passage 86 in the form of the elongated curved hole, and the smooth flow of the hydraulic oil 13 through the fluid passages 86 is established due to the plurality of the valve openings 77 formed through the circumferential wall of the skirt portion 72. That is, the hydraulic oil 13 can flow smoothly in correspondence to the range of the variable flow passage cross-sectional area S3. The damping force variable damper 10 can thus vary a damping force over a wide range.

In other words, since the range over which the flow passage cross-sectional area S3 can vary is wide due to the fluid passage 86 in the form of the elongated curved hole, the flow passage cross-sectional area S3 of the fluid passage 86 can be large in spite of a small amount of deformation of the piezoelectric body 51. As a result, the damping force variable damper 10 can provide a minimum damping force which is smaller than that in the art. That is to say, the damping force of the damping force variable damper 10 can vary over a wide range.

Further, as discussed above, the damping force can be adjusted by changing the pressing force exerted by the piezoelectric body 51 on the valve means 71. That is, the damping force of the damping force variable damper 10 can be changed with the easy control. Therefore, the wide range over which the damping force of the damping force variable damper 10 varies can be established with the easy control.

Next, discussion will be made with reference to FIGS. 9(a)-(b) and FIGS. 10(a)-(b) as to when the piston assembly 14 slides to provide a damping force during extension and contraction of the damping force variable damper 10. First, discussion is made below with reference to FIGS. 9(a)-(b) as to when the piston assembly 14 slides downwardly to provide a damping force during contraction (compression) of the damping force variable damper 10.

Figure 9:
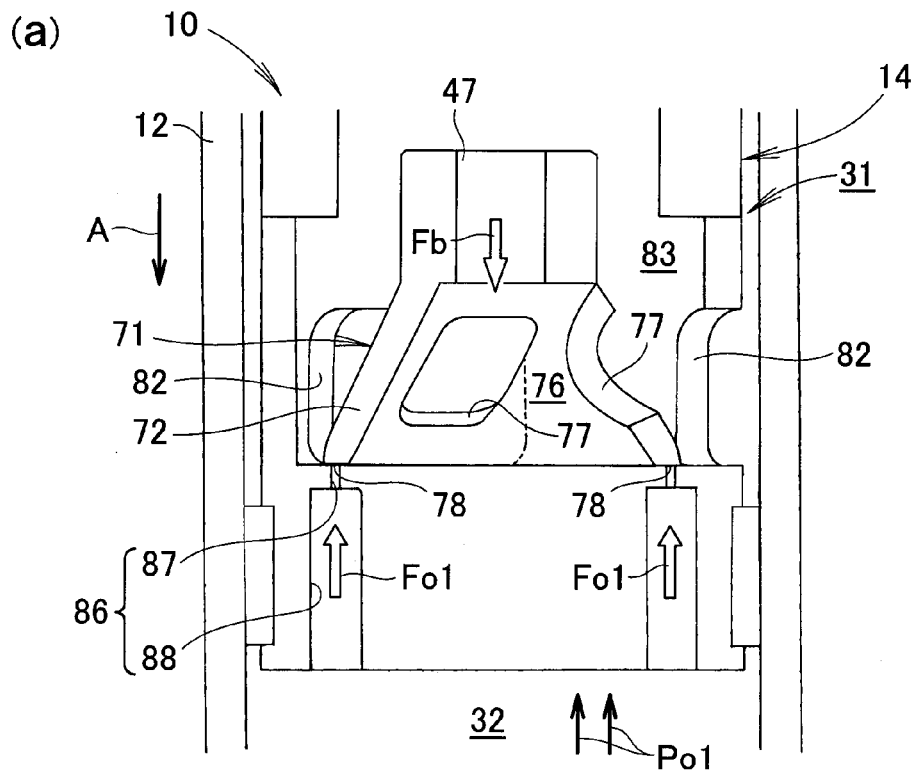
FIGS. 9(a)-(b) are views showing that the piston assembly slides downwardly to provide a damping force.
Figure 9:
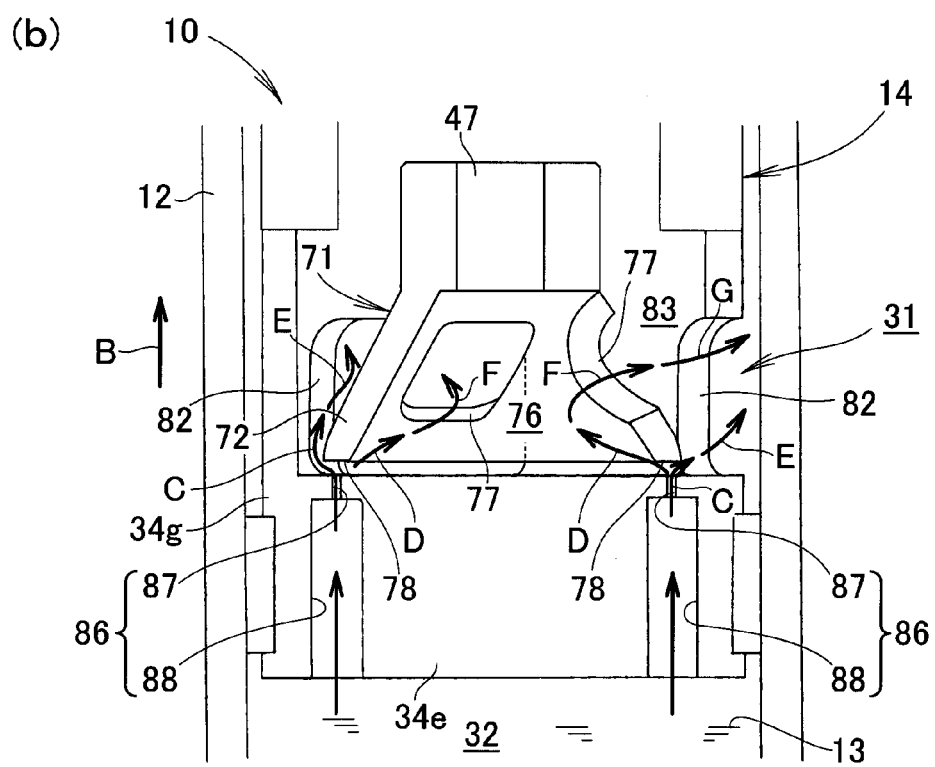

As shown in FIG. 9(a), the piezoelectric body 51 (FIG. 2) stretches with the voltage applied thereto to force the closing lower end 78 of the skirt portion 72 of the valve means 71 to keep closing the upper fluid passage portion 87. When the damping force variable damper 10 contracts with the closing lower end 78 closing the upper fluid passage portion 87, the piston assembly 14 slides (moves) downwardly as shown by an arrow A. By the downward sliding of the piston assembly 14, a differential pressure Po1 between the upper and lower chambers 31, 32 is produced in the lower fluid chamber 32.

The produced differential pressure Po1 applies pressing forces Fo1 to the closing lower end 78 (first pressure-applied portion) of the skirt portion 72. When the pressing forces Fo1 applied to the closing lower end 78 overcome a counterbalancing load Fb, the closing lower end 78 of the skirt portion 72 moves away from the upper fluid passage portion 87. The counterbalancing load Fb is a force pressing the skirt portion 72 toward the upper fluid passage portion 87.

As shown in FIG. 9(b), the closing lower end 78 is pushed up as shown by an arrow B away from the fluid passages 86 (the upper fluid passage portions 87) to open the fluid passages 86. The fluid passage 86 (the upper fluid passage portion 87) is in the form of the elongated curved hole (the slit-shaped opening) extending along the outer circumference 34g of the bottom portion 34e. The overall perimeter length L3 (FIG. 8(b)) of the upper fluid passage portion 87 is thus large and the range over which the flow passage cross-sectional area S3 of the fluid passage 86 is variable is large, too.

Since the fluid passages 86 are open, the hydraulic oil 13 in the lower fluid chamber 32 is directed through the fluid passages 86 into both the valve accommodating space 83 outside the skirt portion 72, as shown by an arrow C, and the valve inner space 76 inside the skirt portion 72, as shown by an arrow D. The hydraulic oil 13 directed into the valve accommodating space 83 is directed through the piston openings 82 into outside the lower wall portion 34d (i.e., the upper fluid chamber 31), as shown by an arrow E.

Meantime, the hydraulic oil 13 directed into the valve inner space 76 is directed through the valve openings 77 into the valve accommodating space 83, as shown by an arrow F. The hydraulic oil 13 directed into the valve accommodating space 83 is directed through the piston openings 82 into outside the lower wall portion 34d (i.e., the upper fluid chamber 31), as shown by an arrow G.

Since the valve opening 77 is entirely aligned with the corresponding piston opening 82, the hydraulic oil 13 in the valve inner space 76 is smoothly directed through the valve openings 77, the valve accommodating space 83 and the piston openings 82 into the upper fluid chamber 31.

Accordingly, the hydraulic oil 13 in the lower fluid chamber 32 is smoothly directed through the fluid passages 86 into the upper chamber 31 when the piston assembly 14 slides (moves) downwardly during the contraction of the damping force variable damper 10. This smooth flow of the hydraulic oil 13 through the fluid passages 86 provides the damping force determined by the pressing forces Po1 (FIG. 9(a)).

Figure 10:
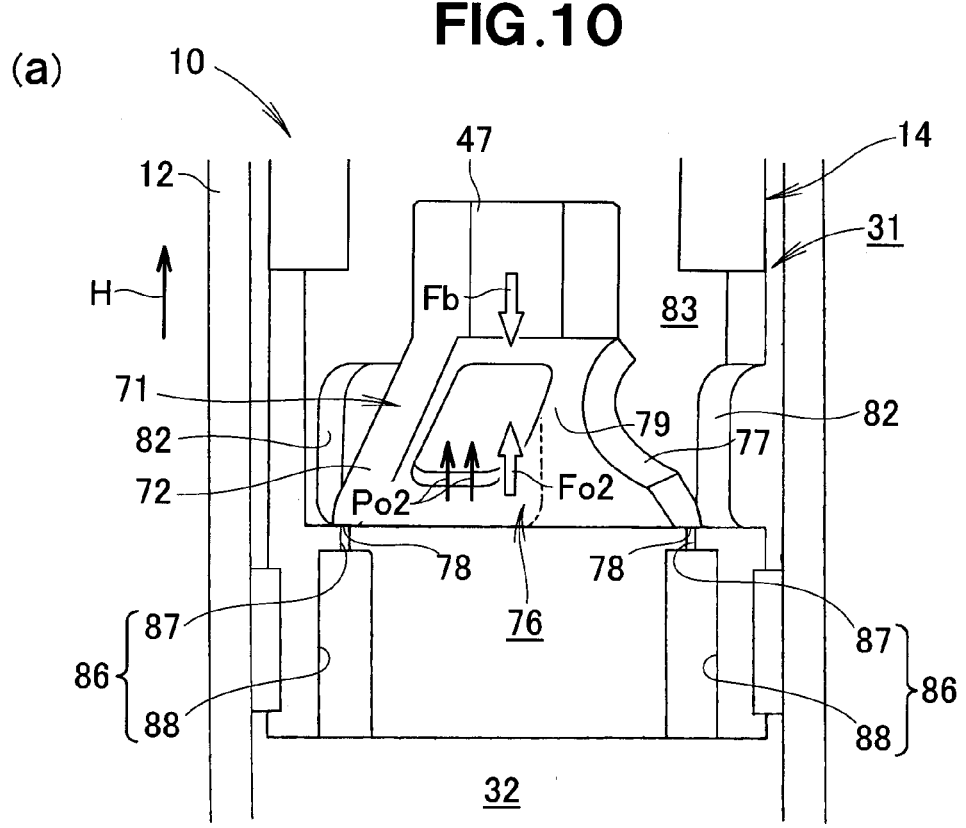
FIGS. 10(a)-(b) are views showing that the piston assembly according to the present invention slides upwardly to provide a damping force.
Figure 10:
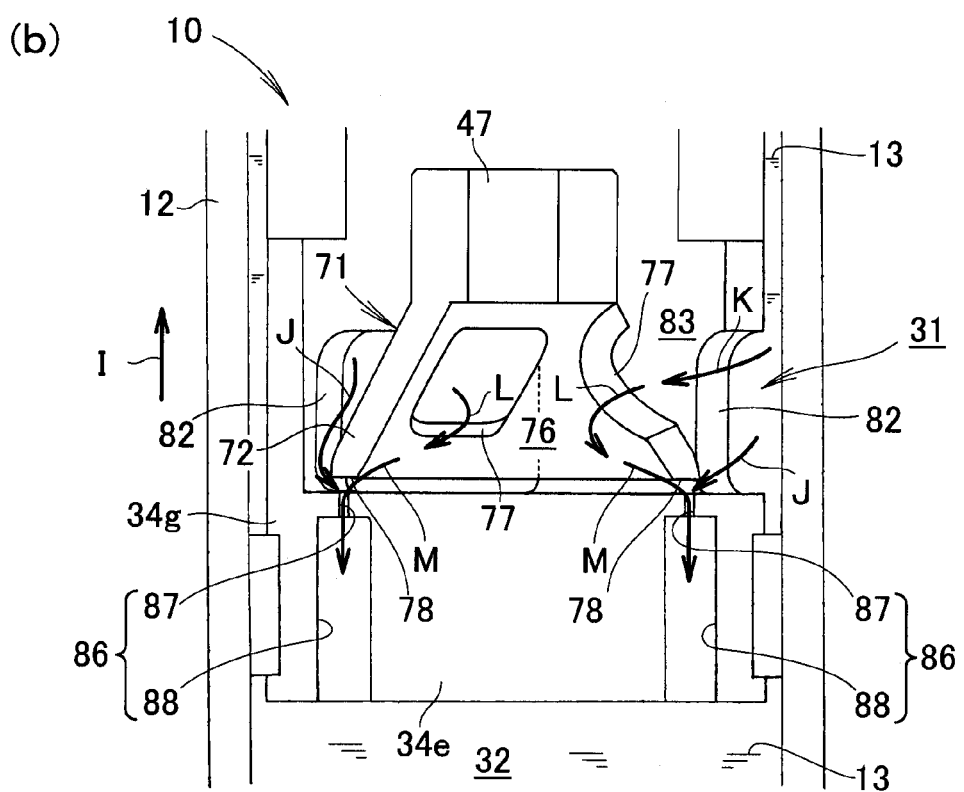

Second, discussion is made below with reference to FIGS. 10(a)-(b) as to when the piston assembly 14 slides upwardly to provide a damping force during extension of the damping force variable damper 10. As shown in FIG. 10(a), when the damping force variable damper 10 extends with the closing lower end 78 of the skirt portion 72 closing the fluid passages 86, the piston assembly 14 slides (moves) upwardly, as shown by an arrow H. The upwardly sliding of the piston assembly 14 increases a hydraulic oil pressure Po2 in the upper chamber 31.

The increased hydraulic oil pressure Po2 applies a pressing force Fo2 to an inner top 79 (a second pressure-applied portion) of the skirt portion 72. When the pressing force Fo2 applied to the inner top 79 of the skirt portion 72 overcomes the counterbalancing load Fb2, the closing lower end 78 of the skirt portion 72 moves away from the upper fluid passage portions 87.

As shown in FIG. 10(b), the closing lower end 78 is pushed up away from the fluid passages 86 (the upper fluid passage portions 87), as shown by an arrow I, to open the fluid passages 86. As discussed above, the overall perimeter length L3 (FIG. 8(b)) of the upper fluid passage portion 87 is large and the range over which the flow passage cross-sectional area S3 of the fluid passage is variable is large.

The hydraulic oil 13 in the upper fluid chamber 31 is directed through the piston openings 82 into both the fluid passages 86, as shown by an arrow J, and the valve accommodating space 83, as shown by an arrow K. The hydraulic oil 13 directed into the fluid passages 86 is then directed into the lower fluid chamber 32.

Meantime, the hydraulic oil 13 directed into the valve accommodating space 83 is then directed through the valve openings 77 into the valve inner space 76 inside the skirt portion 72, as shown by an arrow L. The hydraulic oil 13 directed into the valve inner space 76 is directed through the fluid passages 86 into the lower fluid chamber 32, as shown by an arrow M.

The valve opening 77 is entirely aligned with the corresponding piston opening 82. Thus, the hydraulic oil 13 in the upper fluid chamber 31 can be smoothly directed through the piston openings 82, the valve accommodating space 83, the valve openings 77, the valve inner space 76 and the fluid passages 86 into the lower fluid chamber 32.

Accordingly, the hydraulic oil 13 in the upper fluid chamber 31 is smoothly directed through the fluid passages 86 into the lower chamber 32 when the piston assembly 14 slides (moves) upwardly during the extension of the damping force variable damper 10. This smooth flow of the hydraulic oil 13 through the fluid passages 86 provides the damping force determined by the pressing force Po2 (FIG. 10(a)).

Although the voltage applied to the piezoelectric body 51 has been discussed as being constant in FIGS. 9(a)-(b) and FIGS. 10(a)-(b), the voltage applied to the piezoelectric body 51 may be adjusted (changed). That is, the control section 22 shown in FIG. 2 adjusts (changes) the voltage applied to the piezoelectric body 51 to thereby adjust the amount of stretching of the piezoelectric body 51.

The adjustment of the amount of stretching of the piezoelectric body 51 changes (adjusts) the counterbalancing load Fb (FIG. 9(a) and FIG. 10(a)). In this instance, the flow passage cross-sectional area S3 of the fluid passage 86 is adjusted to adjust the damping force when the fluid passages 86 is opened by the differential pressure Po1 between the upper and lower fluid chambers 31, 32 and the pressure Po2.

In the damping force variable damper 10 shown in FIG. 1, the piezoelectric body 51 is subjected to a reaction force due to vibration occurring when the vehicle 11 travels on a road. The piezoelectric body 51 subjected to the reaction force deforms producing a voltage (electric power). This electric power is stored in the power source 24 (regeneration).

The damping force variable damper according to the present invention is not limited to that in the embodiment, but may be modified or improved. For instance, the plurality of the fluid passages 86 may be spaced at angles other than 120 degrees, such as 180 degrees, although the fluid passages 86 are spaced at 120 degrees in the embodiment.

Although the fluid passages 86 are each in the form of the elongated hole (the slit) along the outer circumference 34g of the piston case 34 in the embodiment, a plurality of circular fluid passages may be formed along the outer circumference 34g. The piston case 34 has a relatively large area at a portion enclosed by the outer circumference 34g. Thus, the plurality of the circular fluid passages formed along the outer circumference 34g has large overall perimeter lengths. The plurality of the circular fluid passages having the large overall perimeter lengths along the outer circumference 34g provide the same advantage as the fluid passages 86 discussed above.

Although the plurality of the piston openings 82 and the plurality of the valve openings 77 are spaced at 120 degrees in the embodiment, the plurality of the piston openings 82 and the plurality of the valve openings 77 may be spaced at other angles such as 180 degrees.

It is noted that the damping force variable damper 10, the vehicle 11, the cylinder 12, the piston assembly 14, the piston case 34, the piezoelectric body 51, the valve means 71, the skirt portion 72, the valve openings 77, the closing lower end 78, the piston openings 82 and the fluid passages 86 may have appropriately modified shapes or configurations other than those discussed above in the embodiment.

INDUSTRIAL APPLICABILITY

The present invention is used in a vehicular suspension system and suitable for an automobile including a damping force variable damper providing a variable damping force by sliding a piston within a cylinder.

REFERENCE SIGNS LIST

10 . . . a damping force variable damper 11 . . . a vehicle 12 . . . a cylinder 13 . . . a hydraulic oil (a fluid) 14 . . . a piston assembly 15 . . . an axis of the cylinder 31 . . . an upper fluid chamber (a first fluid chamber) 32 . . . a lower fluid chamber (a second fluid chamber) 34 . . . a piston case (a piston) 34d . . . a lower wall portion 34g . . . an outer circumference (of the piston) 51 . . . a piezoelectric body 54 . . . a bellows 71 . . . valve means 72 . . . a skirt portion 77 . . . valve openings 78 . . . a closing end 82 . . . piston openings 86 . . . fluid passages

The invention claimed is:

1. A damping force variable damper for use in a suspension system of a vehicle, the damper providing a variable damping force and comprising:
   a cylinder filled with a fluid and having a first fluid chamber and a second fluid chamber;
   a piston slidably disposed within the cylinder, the piston separating the first fluid chamber and the second fluid chamber from each other and having a fluid passage through which the first fluid chamber communicates with the second fluid chamber, wherein the fluid passage is an elongated hole and has a cross-section taken perpendicular to an axial direction of the cylinder, the cross-section having an elongated curved shape along an outer circumference of the piston;
   a valve member disposed in the piston for closing the fluid passage, the valve member opening the fluid passage when the piston slides;
   a piezoelectric body connected to the valve member for pressing the valve member toward the fluid passage when a voltage is applied to the piezoelectric body, wherein change in the voltage applied to the piezoelectric body changes a force pressing the valve member, and the change in the force changes the damping force; and
   a bellows disposed at the valve member for sealingly separating the piezoelectric body from the fluid, the bellows urging a piston in a direction to contract the piezoelectric body.

2. The damper of claim 1, wherein the piston is tubular, and the bellows is spaced radially inwardly from the piston, the bellows having an end portion disposed radially inwardly of the piston.

3. The damper of claim 1, wherein the fluid passage includes an upper fluid passage portion to be pressed by the valve member, and a lower fluid passage portion different from the upper fluid passage portion and larger in cross-sectional area than the upper fluid passage portion.

4. The damper of claim 1, wherein the valve member includes a hollow skirt portion of a generally truncated cone shape, the skirt portion having a closing end for closing the fluid passage when the valve member is pressed, the skirt portion having valve openings formed through a circumferential wall thereof for directing out of the skirt portion the fluid introduced through fluid passage into the skirt portion.

5. The damper of claim 4, wherein the piston includes a cylindrical lower wall portion disposed outside the skirt portion, the lower wall portion including a circumferential wall having piston openings formed therethrough such that an inside of the lower wall portion communicates with an outside of the lower wall portion through the piston openings, the piston openings circumferentially overlapping the valve openings.

6. The damper of claim 5, wherein the skirt portion is spaced from the lower wall portion.

7. The damper of claim 5, wherein the skirt portion is partially in slidable contact with the lower wall portion.

* * * * *